United States Patent [19]

Holka et al.

[11] 4,131,308
[45] Dec. 26, 1978

[54] SELF-DEPLOYING CHIN SPOILER FOR A VEHICLE

[75] Inventors: Thomas C. Holka, Farmington Hills; James V. Chabot, Birmingham; Charles Haddad, West Bloomfield, all of Mich.

[73] Assignee: Ford Motor Company, Dearborn, Mich.

[21] Appl. No.: 868,170

[22] Filed: Jan. 9, 1978

[51] Int. Cl.² .............................................. B62D 37/00
[52] U.S. Cl. ..................................................... 296/1 S
[58] Field of Search ........................ 296/1 S; 280/762; 16/180

[56] References Cited

U.S. PATENT DOCUMENTS 2,036,560  4/1936  Backus .................................. 296/1 S
3,618,998  11/1971 Smauger ............................... 296/1 S Primary Examiner—Robert R. Song
Attorney, Agent, or Firm—John J. Roethel; Keith L. Zerschling

[57] ABSTRACT

The combination of a laterally extending bumper mounted on the front end of a vehicle and a chin spoiler mounted beneath the bumper, the vehicle bumper having an ornamental face bar and a reinforcement member concealed therebehind. The chin spoiler comprises a support means fastened by conventional fastening means to the bumper reinforcement and an airfoil. The airfoil is contoured along its leading edge to complement the frontal contour of the bumper face bar. A hinge means secures the airfoil along its rear edge to the support means rearwardly of the bumper reinforcement. Biasing means interposed between the support means and the airfoil normally biases the latter towards the underside of the bumper face bar in a concealed position beneath the vehicle. The hinge means provides a hinge axis extending laterally of the vehicle about which the airfoil is deployable. The biasing means resists such deployment until the speed of the vehicle reaches a predetermined velocity at which the air pressure exerted upon the upper surface of the airfoil overcomes the biasing force of the biasing means causing the airfoil to pivot downwardly to present greater frontal area to the air stream trying to pass under the vehicle.

9 Claims, 6 Drawing Figures

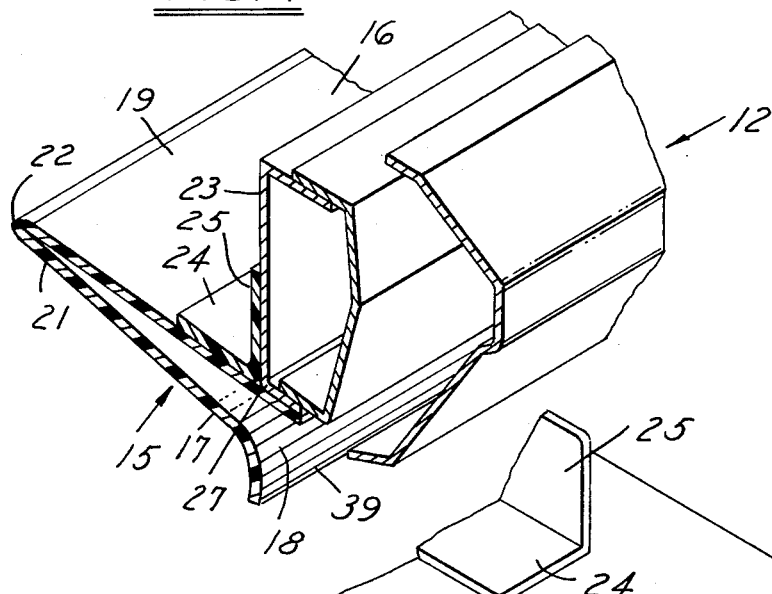
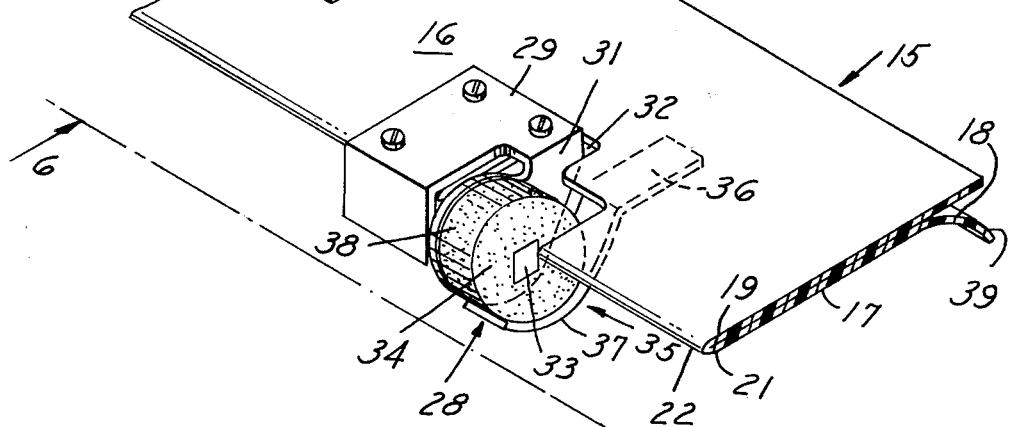
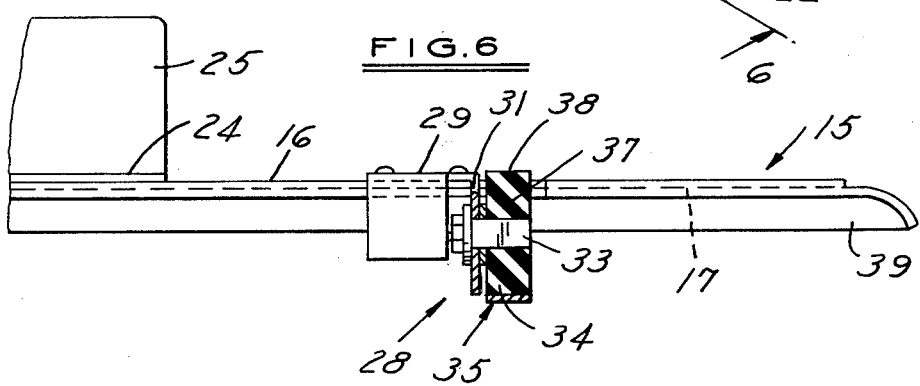

4,131,308

SELF-DEPLOYING CHIN SPOILER FOR A VEHICLE

BACKGROUND OF THE INVENTION

U.S. Pat. No. 2,036,560 issued Apr. 7, 1936 to W. T. Backus for "Land Vehicle Equipment" documents an early attempt to improve the streamlining of moving vehicles by reducing the airflow under the vehicle. The patentee pointed out that the undersurface of a vehicle "is the source of even more loss of efficiency than results from unimproved upper surfaces of the same vehicle" for two reasons. "First, numerous projections on the bottoms of vehicles increase the amount of wind resistance; and, second, the air pressure which is built up underneath the moving car in the restricted space between the bottom surface of the vehicle and the ground increase the amount of draf or retardation from wind resistance." The patentee's solution was to provide an airfoil at the front of the vehicle that had a non-convex upper surface to direct air away from the underside of the vehicle.

Subsequently, it was determined that an airfoil or a spoiler mounted beneath the front end of the vehicle also would be advantageous. The January, 1970 issue of Motor Trend Magazine, at page 40, has a picture of the front end of a vehicle having a fixed spoiler mounted beneath the streamlined nose of the vehicle. The caption accompanying the picture states, "Spoiler not only kills front end lift, but lowers overall drag by limiting airflow under the car, and also aids engine cooling."

Such fixed spoilers have been used on many racing cars and high powered sport model versions of passenger cars.

U.S. Pat. No. 3,618,998 issued Nov. 9, 1971 to D. A. Swauger for "Wind Load Applicator and Stabilizer for Steerable Front Wheels of Rear-Engine Vehicles" carried the concept of a front end stabilizer or spoiler mounted beneath the vehicle a step further. The Swauger patent discloses an airfoil member pivotally mounted adjacent and relative to a flat pan bottom of a well known type of vehicle. A spring-loaded means supports the airfoil member in a normally raised position, the spring-loaded means being yieldable, however, to permit increased downward inclination of the airfoil and therefore greater downward pressure of the tires of the vehicle upon the pavement.

It is an object of the present invention to provide a self-deployable spoiler that is coordinated with the bumper structure of a vehicle. The spoiler is inconspicuous at no or low speed, but is adapted to self-deploy when the vehicle reaches critical speeds where such devices become effective or beneficial. Such a spoiler, because of its forward location, is known as a "chin spoiler."

SUMMARY OF THE INVENTION

The present invention relates to a laterally extending vehicle bumper mounted on the front end of a vehicle and a chin spoiler mounted beneath the bumper, the vehicle bumper having an ornamental face bar and a reinforcement member concealed therebehind. The chin spoiler comprises a support means and conventional fastening means attaching the support means to the bumper reinforcement. An airfoil, contoured along its leading edge to complement the frontal contour of the bumper face bar, is pivotally mounted beneath the bumper. The airfoil is secured along its rear edge to the support means rearwardly of the bumper reinforcement by a hinge means. Biasing means interposed between the support means and the airfoil normally bias the latter toward the underside of the bumper face bar in a concealed position beneath the vehicle. The hinge means provides a hinge axis extending laterally of the vehicle with the airfoil being deployable about this hinge axis. The biasing means resists such deployment until the speed of the vehicle reaches a predetermined velocity at which the air pressure exerted upon the upper surface of the airfoil overcomes the biasing force of the biasing means thereby causing the airfoil to pivot downwardly to present greater frontal area to the airstream trying to pass under the vehicle.

DESCRIPTION OF THE DRAWINGS

Other objects, advantages and features of the present invention will be made more apparent as this description proceeds, particularly when considered in connection with the accompanying drawings, wherein:

FIG. 4 is an enlarged fragmentary perspective view in part sectional showing in greater detail the relationship of the spoiler to the vehicle bumper;

FIG. 5 is a fragmentary perspective view disclosing a preferred construction and arrangement for biasing the airfoil of the spoiler in a non-deployed condition; and FIG. 6 is a view taken substantially in the direction of the arrows 6—6 of FIG. 5.

DETAILED DESCRIPTION OF THE INVENTION

Figure 1:
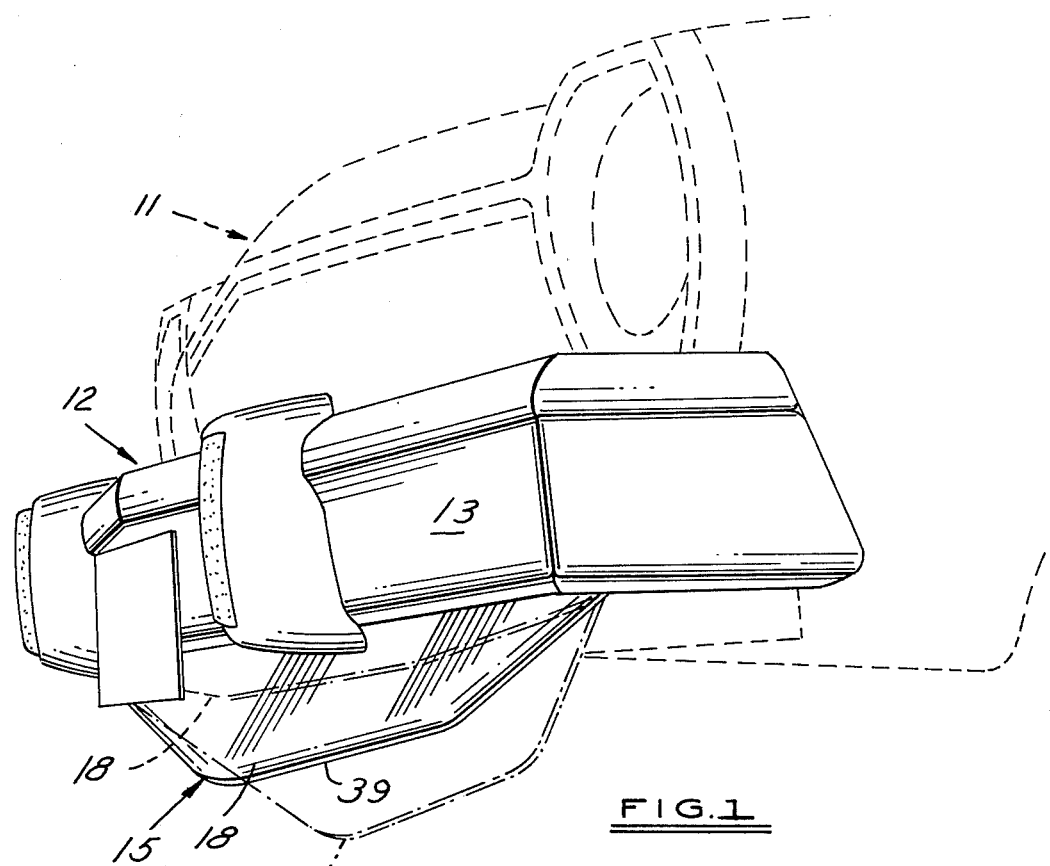
FIG. 1 is a fragmentary perspective view of the front end of a vehicle having the bumper-spoiler combination embodying the present invention, the spoiler being shown deployed in at least three positions.

Referring now to the drawings, FIG. 1 represents the front end of a motor vehicle, generally designated 11, having a forwardly projecting bumper assembly 12. The vehicle bumper assembly 12 comprises an ornamental face bar 13 and a box section reinforcing member 14 concealed behind the face bar 13.

Mounted beneath the bumper 12 is a deployable chin spoiler, generally designated 15, embodying the present invention. The chin spoiler 15 comprises an assembly of a support means and an airfoil. The support means is an elongated plank or leaf 16 that is attached to the bumper reinforcement 14 in any convenient manner, as by mechanical fastening devices or adhesives, with its longitudinal axis substantially paralleling the longitudinal axis of the bumper reinforcement 14. The airfoil 17 is vertically contoured along its leading edge portion 18 to complement the vertical frontal contour of the bumper face bar 13.

The airfoil 17 also may be considered a leaf. Preferably, the support leaf 16 and the airfoil leaf 17 are molded of a suitable plastic and are integrally connected to each other along their rear edge portions 19 and 21 by a living hinge 22 (see FIG. 4). It should be understood, however, that the leaves 16 and 17 may be molded as separate pieces and connected by an equivalent mechanical hinge device such as the well known piano hinge. The longitudinal axis of the airfoil 17 substantially parallels the longitudinal axis of the support leaf 16 and thereby the longitudinal axis of the bumper reinforcement 14.

The bumper reinforcement 14 has a vertical rear face 23. The support leaf 16 has an elongated right angle brace 24 mounted on its upper surface, the brace 24 having a vertical upstanding flange 25 positioned against the vertical rear face 23 of the bumper reinforcement 14. The primary function of the brace 24 is to reinforce the support leaf 16 against bending stresses that would tend to bend the leaf around the rear lower edge 27 of the bumper reinforcement 14.

The airfoil 17 is normally biased upwardly toward the support leaf 16 by biasing devices 28. At least two biasing devices 28 are utilized, the devices being located near the outboard ends of the airfoil 17. As best seen in FIGS. 5 and 6, a biasing device 28 comprises a bracket 29 secured to the support leaf 16, the bracket having a depending flange 31 projecting downwardly through a cut-away portion 32 in the support leaf 16 and airfoil 17. The flange 31 receives a shaft or bolt 33 of a cylindrical elastomeric torsion element 34, the latter being non-rotatably held relative to the bracket 29. A torsion element engageable member 35 is mounted on the underside of the airfoil. As best seen in FIGS. 5 and 6, the member 35 has a paddle portion 36 bonded or otherwise mechanically fastened to the airfoil and an arcuate portion 37 bonded to the perimeter 38 of the torsion element 35.

Figure 2:
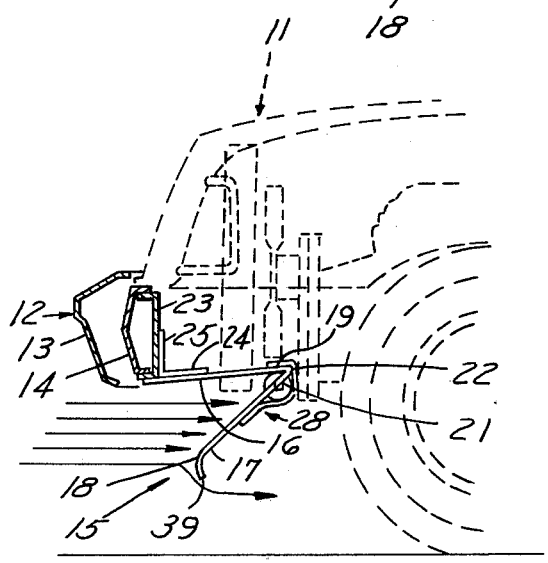
FIG. 2 is a side elevation illustrating the spoiler in a deployed condition.
Figure 3:
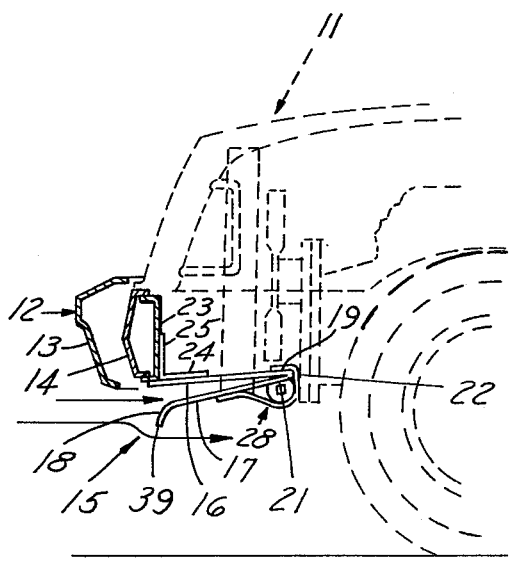
FIG. 3 is a view in part similar to FIG. 2 illustrating the spoiler in non-deployed condition.

The airfoil leading edge 18 has a downwardly extending lip 39 adapted to catch a portion of the airstream passing underneath the vehicle, see FIG. 3. The torsion elements 34 resist downward pivoting movement of the airfoil until the forward speed of the vehicle approximates 40 miles per hour (64.37 kilometers per hour). At this speed, the deployed condition shown in FIG. 2 is obtained. With reference to FIG. 1, the deployed airfoil is shown in solid outline in approximately the FIG. 2 position, but it may be in any position such as either of the two dot and dash outline positions shown or any other intermediate position between non-deployment and maximum deployment permitted by the torsion elements depending on vehicle speed above 40 mph (64.37 kmph).

The integration of the chin spoiler 15 with the bumper 12 is advantageous for several reasons. The underside of the bumper structure is relatively uncluttered and provides a convenient place to mount the chin spoiler assembly. The alignment of the chin spoiler beneath the bumper for concealment from above is facilitated. Also, since the bumpers of current model vehicles are mounted on energy or shock absorbing devices that permit rearward movement of the bumper under impact, the chin spoiler assembly is protected since it moves with the bumper unit.

It is to be understood this invention is not limited to the exact constructions illustrated and described above, but that various changes and modifications may be made without departing from the spirit and scope of the invention.

We claim:

1. A combination of a laterally extending bumper mounted on the front end of a vehicle and a self-deploying chin spoiler mounted beneath the bumper,
   the vehicle bumper having an ornamental face bar and a reinforcing member concealed therebehind,
   and the chin spoiler comprising a support means attached to said bumper reinforcing member,
   an airfoil contoured along its leading edge to complement the frontal contour of the bumper face bar,
   hinge means securing the airfoil along its rear edge to the support means rearwardly of said bumper reinforcing member,
   and biasing means interposed between the support means and the airfoil normally biasing the latter toward the underside of the bumper face bar in a concealed position beneath the vehicle,
   the hinge means providing a hinge axis extending laterally of the vehicle about which the airfoil is deployable,
   the biasing means resisting such deployment until the speed of the vehicle reaches a predetermined velocity at which air pressure exerted upon the upper surface of the airfoil overcomes the biasing force of the biasing means.

2. The combination of a bumper and chin spoiler mounted therebeneath according to claim 1, in which:
   the biasing means comprises at least one support bracket fixed to the support means for co-action with a torsion element,
   coupling means coupling the torsion element to the airfoil.

3. The combination of a bumper and chin spoiler mounted therebeneath according to claim 2, in which:
   the support means and airfoil comprise elongated leaves integrally connected to each other along their rear edges by a living hinge,
   the longitudinal axes of the leaves substantially paralleling the longitudinal axis of the vehicle bumper.

4. The combination of a bumper and chin spoiler mounted therebeneath according to claim 3, in which:
   said bumper reinforcing member has a vertical rear face,
   and the supprot means leaf has a brace mounted thereon having a vertical, upstanding flange positioned against the vertical rear face of said bumper reinforcing member,
   the brace reinforcing the support leaf against bending stresses around the rear lower edges of said bumper reinforcing member.

5. The combination of a bumper and chin spoiler mounted therebeneath according to claim 4, in which:
   the leading edge of the airfoil leaf has a downwardly extending forward lip to catch an air stream to initiate deployment of the airfoil leaf about the hinge axis.

6. The combination of a bumper and chin spoiler mounted therebeneath according to claim 1, in which:
   the support means and chin spoiler comprise elongated leaves integrally connected to each other along their rear edges by a living hinge,
   the longitudinal axes of the leaves substantially paralleling the longitudinal axis of the vehicle bumper.

7. The combination of a bumper and chin spoiler mounted therebeneath according to claim 6, in which:
   said bumper reinforcing member has a vertical rear face,
   brace means mounted on the upper surface of the support means leaf abutting the vertical rear face of said bumper reinforcing member,
   the brace means reinforcing the support leaf against bending around the rear lower edge of said bumper reinforcing member.

8. The combination of a bumper and chin spoiler mounted therebeneath according to claim 7, in which:
   the leading edge of the airfoil leaf has a downwardly extending forward lip to catch the air stream to initiate deployment about the hinge axis of the leaf.

9. The combination of a bumper and chin spoiler mounted therebeneath according to claim 1, in which:
   the biasing means resists deployment of the chin spoiler airfoil until the forward speed of the vehicle approximates 40 miles (64.37 kilometers) per hour.

* * * * *